Aug. 13, 1963    W. R. MUNK    3,100,398
DEVICE FOR THE REMOTE RECORDING OF CRYOGENIC TEMPERATURES
Filed Oct. 27, 1960

INVENTOR.
WERNER R. MUNK
BY
*Isler & Ornstein*
ATTORNEYS

...

United States Patent Office 3,100,398
Patented Aug. 13, 1963

3,100,398
DEVICE FOR THE REMOTE RECORDING OF CRYOGENIC TEMPERATURES
Werner R. Munk, 630 W. Ranch Drive, Chesterland, Ohio
Filed Oct. 27, 1960, Ser. No. 65,312
10 Claims. (Cl. 73—368.4)

This invention relates, as indicated, to a device or instrument for the remote recording of cryogenic temperatures.

Although vapor bulbs have heretofore been used for measuring or recording the temperature of cryogenic liquids or fluids, they sense only the coldest temperature with which they come into contact. This is highly disadvantageous, because in many cases, portions of the device, the probe or instrument must first pass through a colder media than that of the cryogenic fluid or liquid, the temperature of which is being recorded, and the probe or instrument thus becomes untrustworthy.

The present invention has as its primary object the provision of a device of the character described, which enables the temperature of cryogenic liquids or fluids to be accurately recorded or measured, at distances remote from such liquids or fluids, and even in cases or situations where portions of the device, probe or instrument are required to pass through media colder than that of the cryogenic fluid or liquid, the temperature of which is being recorded.

Another object of the invention is to provide a device of the character described which consists of a minimum number of parts of extremely simple construction, many of which are readily available from commercial sources, and all of which can be quickly and easily assembled, enabling the device to be sold at a relatively low price.

Other objects and advantages of my invention will be apparent during the course of the following description.

In the accompanying drawings forming a part of this specification, and in which like numerals are employed to designate like parts throughout the same, FIG. 1 is a fragmentary longitudinal cross-sectional view of a device embodying the invention, and showing also, in somewhat diagrammatic form, certain related parts or equipment used in association with the device;

Figure 1:
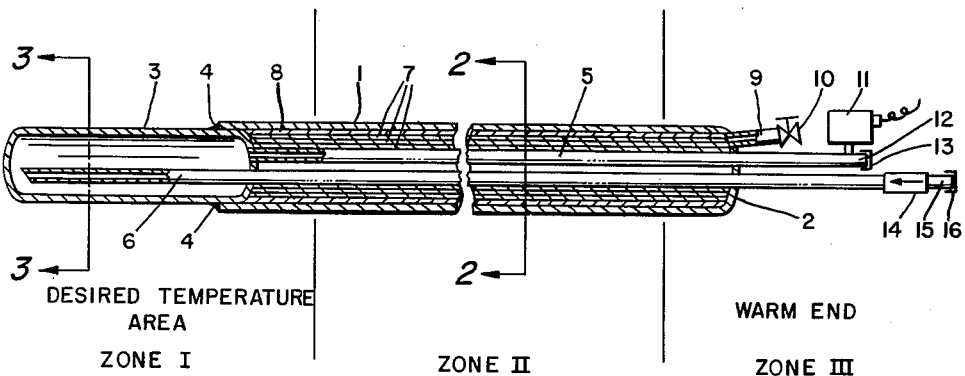
Figure 2:
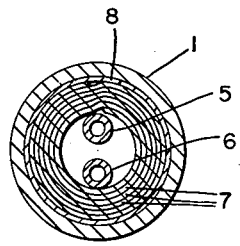
FIG. 2 is a transverse cross-sectional view, on an enlarged scale, taken on the line 2—2 of FIG. 1.
Figure 3:
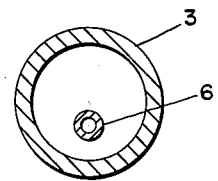
FIG. 3 is a transverse cross-sectional view, on an enlarged scale, taken on the line 3—3 of FIG. 1.

Referring more particularly to FIGS. 1, 2 and 3 of the drawings, the recording device is seen to comprise a tubular housing 1, closed at its rear end by a wall 2 and open at its forward end. This housing is preferably made of one of the Series 300 stainless steels.

Mounted in the forward end of the housing 1 is a thin-walled bulb 3, made of copper, this tube being brazed to the housing 1 as at 4.

The bulb 3 is provided with a tubular pressure sensing conduit or line 5, of copper, which extends rearwardly from the bulb and substantially axially through the housing 1 and through the wall 2 of the housing.

The device further includes a tubular purging conduit or line 6, also made of copper, which extends substantially parallel with the line 5 and in closely spaced relation to the latter, the line 6 extending through the end wall 2 of the housing and into the bulb 3, to a point adjacent the forward end of the bulb, being open at its forward end.

For the purpose of insulating the lines 5 and 6 from the wall of the housing 1, the space between these lines and the inner wall of the housing is filled with fiberglass insulation 7, in the form of a strip or sheet of fiberglass wrapped spirally about the lines 5 and 6, in the manner shown in FIG. 2, a strip or sheet 8 of aluminum foil being interposed between the outermost convolution of the fiberglass strip and the inner wall of the housing 1. With the polished or shiny face of the aluminum foil strip 8 facing outwardly, heat radiation losses are reduced to a minimum.

Extending rearwardly from the rear wall 2 of the housing 1 is a conduit 9 through which the air or other gases in the housing 1 may be exhausted to produce a high vacuum in the housing, the conduit 9 being provided with an outgassing valve 10.

The pressure sensing line 5 is connected to a pressure transducer 11, the function of which will be explained presently, the line 5 being provided with an extension terminating in a port 12, provided with a closure cap 13.

The purging line 6 is provided with a purge check valve 14 and terminates in a port 15, provided with a closure cap 16.

The device, as thus described, is utilized for the measuring or recording of cryogenic temperatures of cryogenic liquids or fluids, in which the measuring or recording is done at points remote from the cryogenic fluid or liquid, and depends for its functioning on the vapor pressure of a cryogenic liquid, and the very definite relationship between the vapor pressure and temperature of such a liquid.

The use or operation of the device may be described as follows:

(1) The space within the housing 1 is evacuated through conduit 9 to a pressure of less than .01 mm. of mercury (absolute pressure), whereby a thermal conductivity between the lines 5 and 6 and the inner wall of the housing 1 of approximately .01 B.t.u./hr. ft.$^2$ ° F. (per hour per square foot per degree Fahrenheit) is obtained.

(2) The bulb 3 is purged by removing the cap 13 of the port 12, removing the cap 16 of the port 15, and running through the purging line 6, bulb 3 and sensing line 5, a gas whose physical characteristics are closely related to or the same as that of the cryogenic liquid or fluid, the temperature of which is to be measured or recorded, and encompass the temperature range of such cryogenic liquid or fluid. After the bulb 3 has been thus purged, the cap 13 is replaced, and the bulb, as well as the lines 5 and 6, are pressurized with the gas, and the cap 16 is replaced.

(3) The device is then subjected to or submerged in the cryogenic liquid or fluid, the temperature of which is to be measured, the vapor pressure in the bulb 3 being recorded by means of the pressure transducer 11. This transducer, which is a well-known instrument, is provided with an electrical output for recording on a strip chart recorder or oscillograph.

With the high ratio of thermal conductivity of copper to stainless steel, it is possible to immerse the device into a depth of cryogenic liquid and have only the bulb 3 do the temperature sensing. The small amount of heat loss which occurs across the insulating barrier consisting of the fiberglass insulation 7 is compensated by the heat leak along the lines 5 and 6 from zone III to zone II (see FIG. 1). In this way, the parts 5 and 6 of the device that are in contact with the internal gas are slightly warmer than the temperature in zone I (FIG. 1), that is, the temperature measured by the bulb 3.

Figure 4:
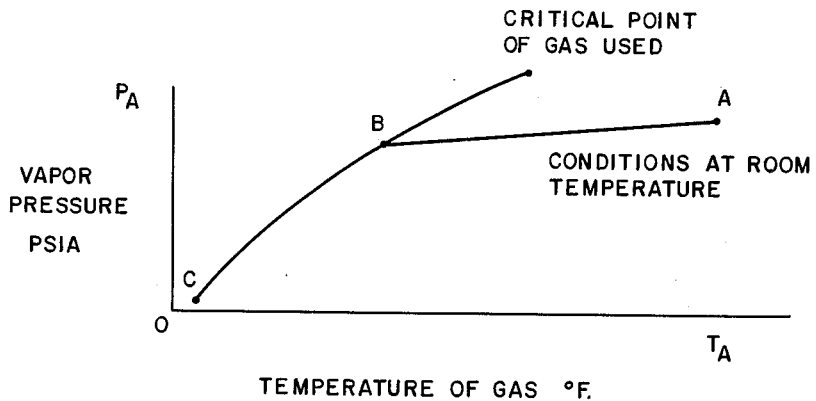
FIG. 4 is a characteristic curve of the instrument, illustrating the relationship between vapor pressure and temperature.

From this point on, the normal phenomena of the relationship between vapor pressure and temperature is employed to permit the recording of the vapor pressure, and hence, the temperature. The characteristic curve of an instrument of this type is illustrated in FIG. 4, and upon reference to FIG. 4, it will be seen that upon submersion or immersion of the device in the cryogenic fluid or liquid, the temperature of which is to be measured, the pressure in the bulb decays from the point A to the point B, where it intersects the vapor pressure curve of the gas used in the device. Between the points B and C, the measured pressure has a definite relationship to the temperature of the cryogenic liquid or fluid, the temperature of which is to be measured.

The response of this instrument is a function of the mass of the vapor bulb 3 and of the gas contained in the instrument, i.e., the fastest response is obtained when the mass of the bulb is a minimum, and the mass of the gas in the bulb is a minimum. It follows from this that if the useful temperature range $T_{BC}$ is to be increased, the time or period of response is also increased.

Among the advantages of the present instrument, are (a) The instrument does away with the principal disadvantage of a common vapor bulb, since the portions of the pressure sensing line 5 and the purging line 6, between the bulb 3 and transducer 11 are thermally isolated, so that the point of temperature sensing is at the bulb 3 and not at any possible intermediate point along the instrument.

(b) Since the device employs a pressure transducer having an electrical output for recording on a strip chart recorder or oscillograph, this enables the data analyst to view the raw data, as generated, from a highly dynamic cryogenic propulsion system, instead of utilizing visual readings taken from a Bourdon tube type pressure gauge.

(c) The device consists of a minimum number of parts of extremely simple construction, many of which are readily available from commercial sources, and all of which can be quickly and easily assembled, enabling the device to be sold at a relatively low price.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a device of the character described, an elongated tubular housing, a metallic bulb mounted in one end of said housing in sealed relation to said housing, a sensing conduit extending from said bulb and through said housing, a second conduit extending through said housing in spaced substantially parallel relation with said first conduit for introducing a gas under pressure into said bulb, the space between said conduits and the walls of said housing being evacuated.

2. A device, as defined in claim 1, in which said housing is made of stainless steel and said bulb and conduits are of copper.

3. A device, as defined in claim 2, including means within said housing walls and between said walls and said conduits for thermally insulating said conduits from said housing, said insulation comprising fiberglass.

4. A device, as defined in claim 1, in which the major portion of said bulb projects beyond said end of said housing.

5. A device, as defined in claim 1, including a conduit extending rearwardly from said housing and through which the space within said housing may be evacuated.

6. A device, as defined in claim 5, in which said space is evacuated to a pressure of less than .01 mm. of mercury (absolute pressure), whereby a thermal conductivity between said first and second named conduits and the inner wall of said housing of approximately .01 B.t.u./hr. ft.$^2$ ° F. is obtained.

7. A device, as defined in claim 5, in which said first-named conduit communicates with a pressure transducer having an electrical output for recording on a strip chart recorder or oscillograph.

8. A device, as defined in claim 5, in which said second-named conduit is provided with a check valve.

9. In a device of the character described, an elongated tubular housing of stainless steel closed at its rear end and open at its forward end, a hollow copper bulb extending from said open end of said housing and brazed to said housing, said bulb having a copper conduit of small bore extending therefrom and substantially axially through said housing and through the rear end wall of said housing, a second copper conduit of small bore extending through the rear end wall of said housing and in closely spaced parallel relation to said first conduit and into said bulb, the space between said conduits and the walls of said housing being evacuated, and thermal insulation material interposed between said conduits and the inner wall of said housing.

10. A device, as defined in claim 9, in which said bulb contains a gas, under pressure, and having physical characteristics encompassing the temperature of the cryogenic liquid or fluid, the temperature of which is to be measured.

References Cited in the file of this patent
UNITED STATES PATENTS

| | | |
|---|---|---|
| 1,165,564 | Amthor | Dec. 28, 1915 |
| 1,326,176 | Boyce | Dec. 30, 1919 |
| 1,721,617 | Durant | July 23, 1929 |
| 2,144,762 | Kendall | Jan. 24, 1939 |